United States Patent
Yetukuri et al.

(10) Patent No.: US 7,044,556 B1
(45) Date of Patent: May 16, 2006

(54) HEAD RESTRAINT ROLLER GUIDE

(75) Inventors: Nagarjun Yetukuri, Rochester Hills, MI (US); Mladen Humer, Eastpointe, MI (US); Gerald S. Locke, Lake Orion, MI (US); Dale Smallwood, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/908,542

(22) Filed: May 16, 2005

(51) Int. Cl.
*B60R 22/28* (2006.01)
(52) U.S. Cl. .................................... 297/410
(58) Field of Classification Search ............... 297/410, 297/391, 463.1
See application file for complete search history.

(56) References Cited

U.S. PATENT DOCUMENTS 4,657,425 A * 4/1987 Takahashi ................. 403/104
6,899,395 B1 * 5/2005 Yetukuri et al. ........... 297/408
2002/0093231 A1 * 7/2002 Estrada et al. .......... 297/16.12

* cited by examiner

Primary Examiner—Milton Nelson, Jr.
(74) Attorney, Agent, or Firm—Earl LaFontaine, Esq.

(57) ABSTRACT

An automotive seat assembly is provided including a seatback assembly including an upper seatback surface and a guide stem positioned within. A head restraint post is positioned within the guide stem, and includes a head restraint mount end and a seatback insertion end. A head restraint element is mounted to the head restraint mount end. A roller guide is mounted in proximity to the upper seatback surface and comprises a bezel element inserted into the guide stem. A primary roller housing is mounted to said bezel element and forms a center cylindrical path through which the head restraint post passes. A primary roller element is rotatably mounted within the primary roller housing and is biased into communication with the head restraint post by way of a roller bias such that the head restraint post is restrained from motion absent the application of a vertical adjustment force. A housing cap is mounted over the bezel element.

20 Claims, 3 Drawing Sheets

HEAD RESTRAINT ROLLER GUIDE

TECHNICAL FIELD

The present invention relates generally to an automotive seat assembly and more particularly to an automotive seat assembly with a head restraint roller guide.

BACKGROUND OF THE INVENTION

Automotive design often is the end result of the balancing of a vast array of countervailing factors. Components must be practical but appealing, robust but light weight, and inexpensive to produce but complex in performance. Often consumers perceive a design that fails to fulfill both sides of the coin as deficient. This in turn may result in a costly impact on the designers and manufacturers when such perceptions are translated into lagging sales or damaged reputation. This scenario is played out time and time again in the field of noise and vibration control.

The automotive environment is filled with a vast plurality of components to which motion in the hands of the operator is one of their primary functions. Unfortunately, the automotive environment additionally imparts a wide variety of impact and momentum related forces on these same components during routine operation. The vibrations for the vehicle engine and drivetrain in combination with forces transferred from the road upward through the suspension are all eventually imparted to such movable components. Undue vibrations transferred to these components may lead to premature fatigue and may contribute to noise within the automobile interior. This noise, in turn, can have a significant and lasting impression on the vehicle occupants regarding the perceived quality of the automobile as a whole.

Such is the case with automotive head restraints/headrests. These head restraints are commonly mounted to the automotive seatbacks and are provided a range of vertical adjustment so as to be operator adjustable to both comfort and personal configuration. The head restraint posts, however, when subjected to the vibrations and stresses the automotive environment may tend to produce a rattle or other noise within the seatback. The design approach to date has been to counter such noise generation by increasing the stiffness of the head restraint. This increase in restraint, however, in present designs results in an increase in operation and effort. Thus present designs trade one consumer inconvenience for another. This is unsatisfactory. It would be highly desirable to have a design for an automotive seatback and head restraint assembly that minimize the looseness of the head restraint posts without adversely affecting operational efforts.

SUMMARY OF THE INVENTION

It is, therefore, an object of the present invention to provide an automotive seat assembly with an adjustable head restraint assembly. It is a further object of the present invention to provide such seat assembly that minimizes the looseness of the head restraint assembly without adversely affecting the operational effort.

An automotive seat assembly is provided including a seatback assembly including an upper seatback surface and a guide stem positioned within. A head restraint post is positioned within the guide stem, and includes a head restraint mount end and a seatback insertion end. A head restraint element is mounted to the head restraint mount end. A roller guide is mounted in proximity to the upper seatback surface and comprises a bezel element inserted into the guide stem. A primary roller housing is mounted to said bezel element and forms a center cylindrical path through which the head restraint post passes. A primary roller element is rotatably mounted within the primary roller housing and is biased into communication with the head restraint post by way of a roller bias such that the head restraint post is restrained from motion absent the application of a vertical adjustment force. A housing cap is mounted over the bezel element.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
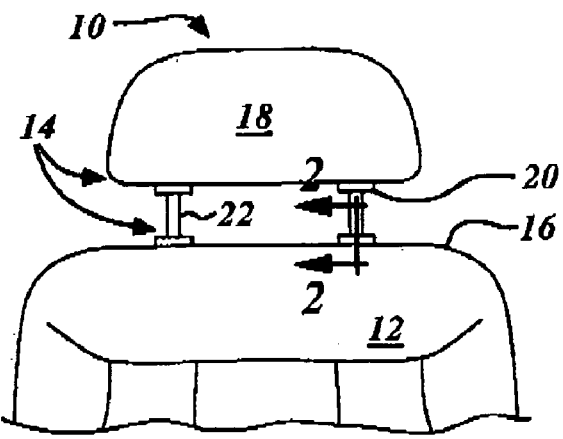
FIG. 1 is an illustration of an automotive seat assembly in accordance with the present invention.
Figure 7:
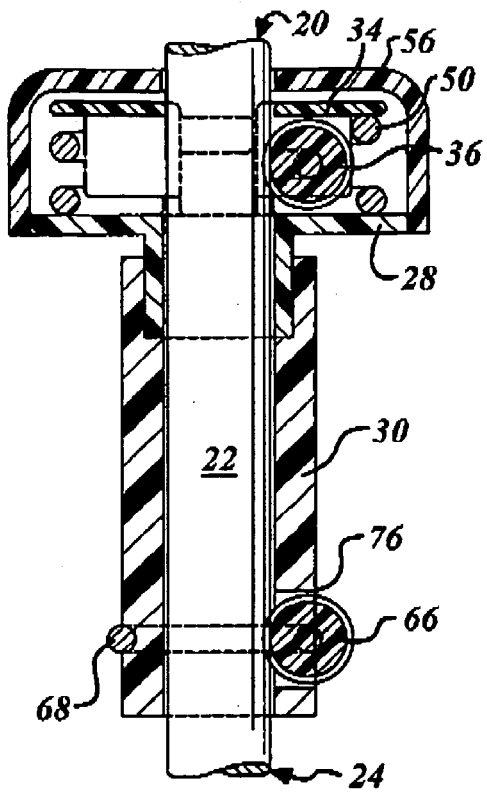
FIG. 7 is a detailed cross-section of an enlarged portion of an alternate embodiment of the roller guide illustration shown in FIG. 2.

Referring now to FIG. 1, which is an illustration of an automotive seat assembly 10 in accordance with the present invention. The seat assembly 10 includes a seatback 12 having a head restraint assembly 14 mounted upon an upper seatback surface 16 of the seatback 12. The head restraint assembly 14 is comprised of a head restraint element 18 mounted to the headrest mounted end 20 of a pair of head restraint posts 22. The seatback intrusion end 24 of the head restraint posts 22 is inserted within the seatback 12 to allow an owner operator to adjust the height and position of the head restraint element 18 (see FIG. 7). An issue arises with existing designs wherein the head restraint posts 22 may suffer undesirable vibrations within the seatback 12 during vehicle operation. While increased restraint on the head restraint posts 22 may reduce such vibrations, it also serves to generate an undesirable level of effort for the user to adjust the height of the head restraint element 18.

Figure 2:
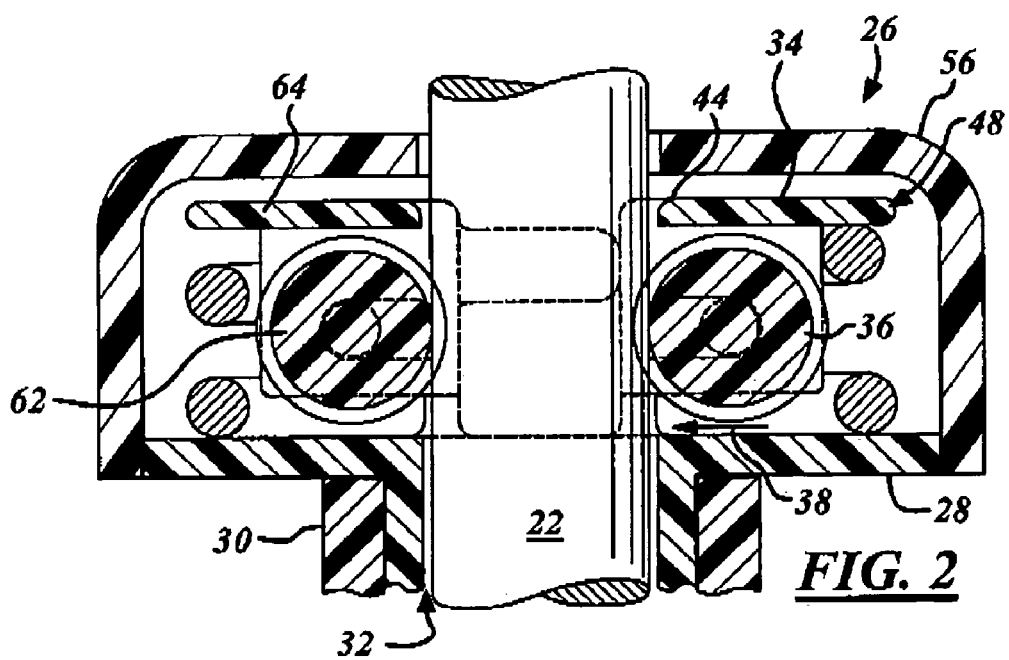
FIG. 2 is a detailed illustration of a portion of the automotive seat assembly illustrated in FIG. 1, the detail illustrating a cross-section of the roller guide.
Figure 4:
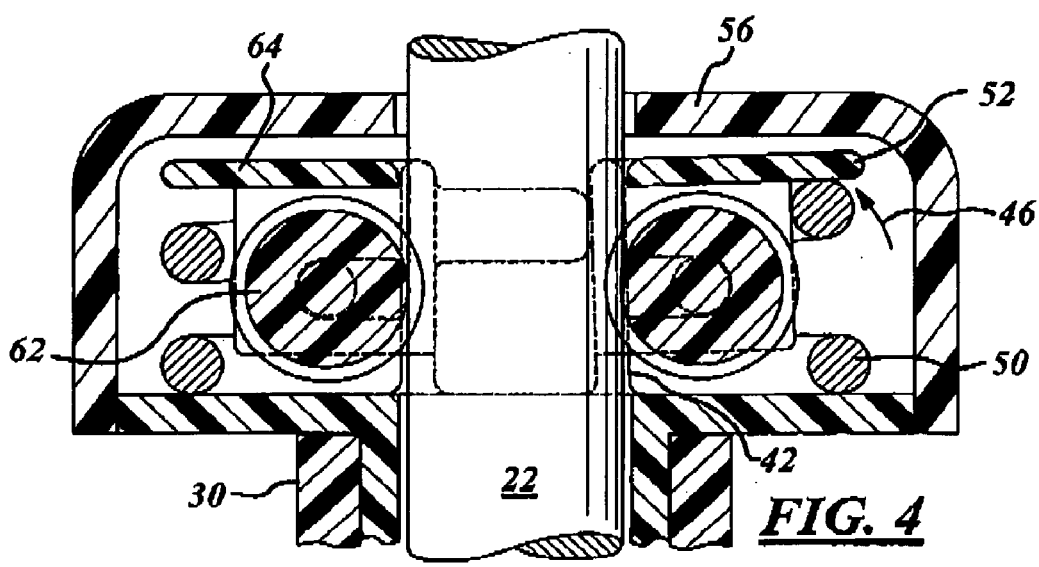
FIG. 4 is an illustration of the roller guide illustration in FIG. 2, the illustration indicating the generation of a vertical hinge bias.
Figure 3:
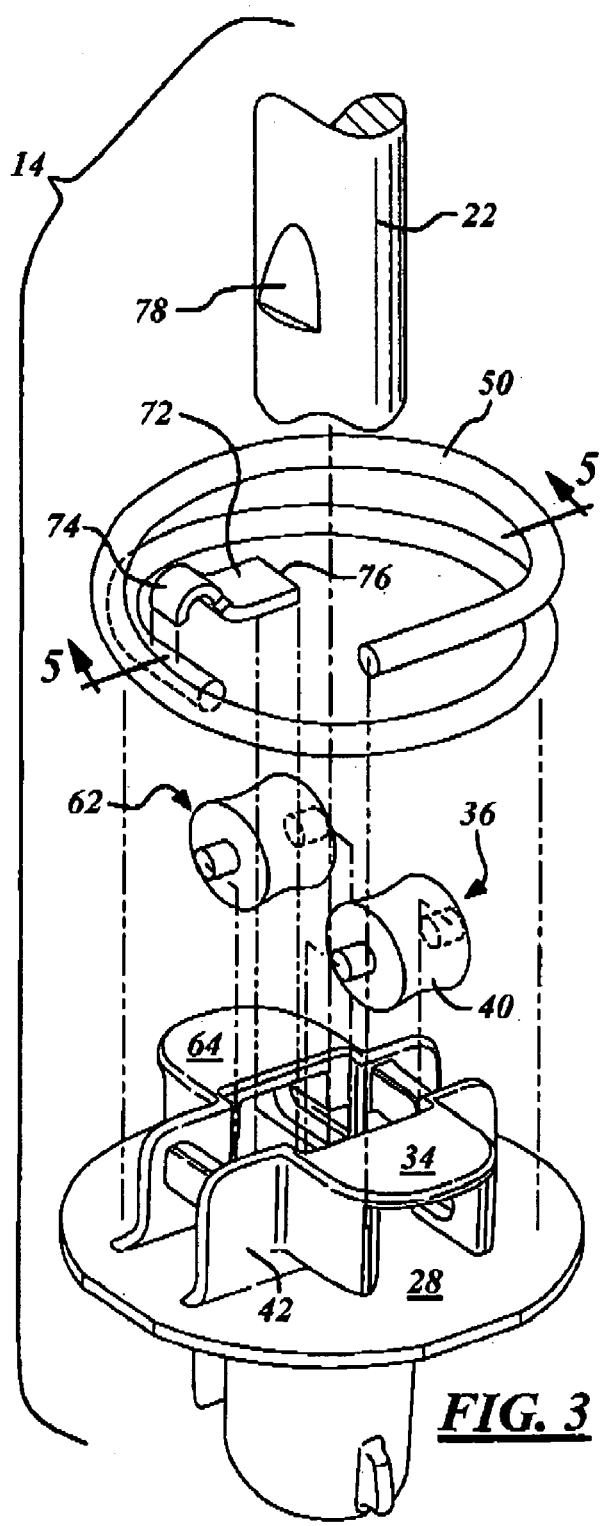
FIG. 3 is a an exploded view illustration of the roller guide illustrated in FIG. 2.

The present invention addresses these concerns through the use of a novel roller guide 26 design as is illustrated in FIGS. 2 through 4. The roller guide 26 is comprises of a bezel element 28 configured to for mounting within a guide stem 30 positioned within the seatback 12. The head restraint post 22 passes through the bezel element 28 and into the guide stem 30 through a center cylindrical path 32 formed through the bezel element 28 and a primary roller housing 34 mounted thereto. Although the primary roller housing 34 is referred to as mounted to the bezel element 28, it should be understood that they may be molded or cast as a single component. The primary roller housing 34 houses a primary roller element 36 biased into direct communication with the head restraint post 22. The primary roller element 36 has a roller bias 38 large enough to prevent motion of the head restraint post 22 within the guide stem 30 absent the application of a vertical adjustment force by the operator. The use of the primary roller element 36 allows the roller bias 38 to be sufficient to minimize vibrations in the head restraint post 22 while providing a smooth rolling response to vertical adjustment efforts. A concave roller engagement surface 40 (see FIG. 3) allows a broad connection surface contacting the head restraint post 22 in addition to allowing for variations in linearity. Similarly, it is contemplated that a degree of lateral roller adjustment movement should be provided within the primary roller element 36 mounting within the primary roller housing 34 such that additional tolerance broadening is allowable. In this fashion, the present invention generates a unique improvement to both vibration reduction as well as operator effort reduction.

Although the roller bias 38 described may be generated in a variety of fashions, one embodiment contemplates the use of a living hinge 42 (see FIG. 4) connecting the primary roller housing 34 to the bezel element 28. A living hinge 42 is a solid but flexible connection formed using a variety of manufacturing techniques. The living hinge 42 is preferably formed on the inner radius surface 44 of the primary roller housing 34. This allows a vertical hinge biasing force 46 located at the outer radius surface 48 to generate a moment force that in turn is translated into the roller bias 38. In addition, it allows the use of a vertical coil spring 50 as the source of the vertical hinge bias 46. The use of a vertical coil spring 50, preferably surrounding the primary roller housing 34, allows for the production of a more precise and constant force production that other orientations. The vertical coil spring 50 is compressed between the bezel element 30 and an engagement lip portion 52 of the primary roller housing 34 and can deliver a precise and reliable vertical hinge bias 46 resulting in a precise and reliable roller bias 38. Thus, the roller bias 38 can be tailored to precisely fit a range of acceptable user effort and acceptable vibration reduction.

Figure 9:
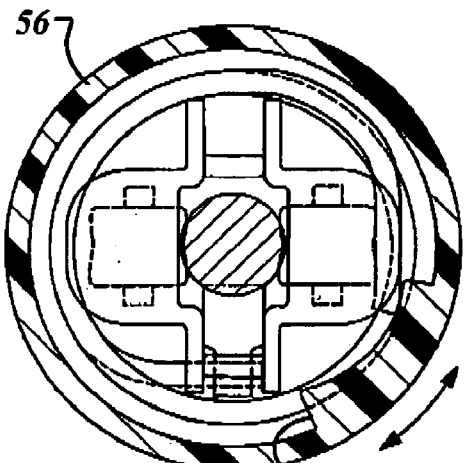
FIG. 9 is a top-view illustration of the cam element tension adjustment feature illustrated in FIG. 8.
Figure 6:
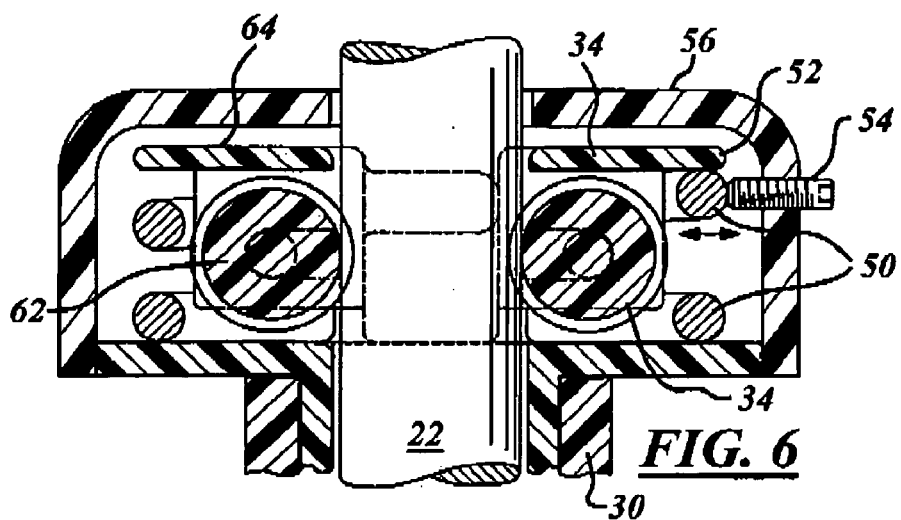
FIG. 6 is a detailed illustration of the roller guide illustration in FIG. 2, the detail illustrating the addition of a tension adjustment feature.
Figure 8:
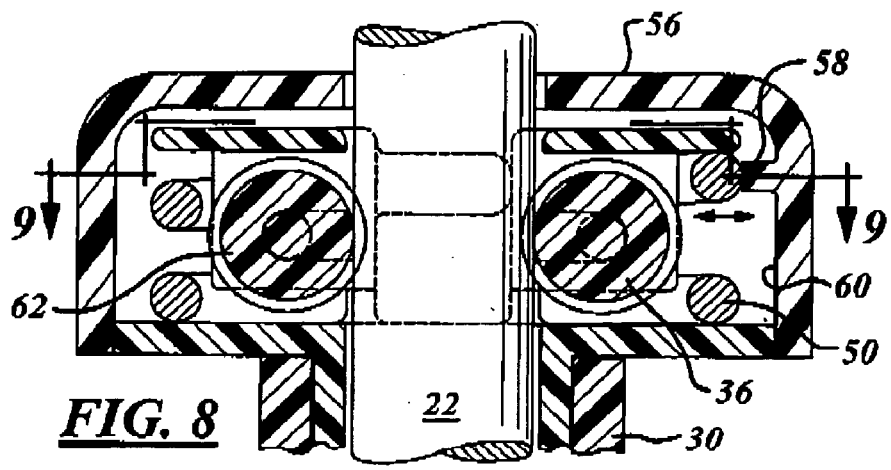
FIG. 8 is a detailed illustration of the roller guide illustration in FIG. 2, the detail illustrating the addition of a cam element tension adjustment feature.

It is additionally contemplated that the roller bias 38 can be fine tuned in the present invention by control of the position of the contact between the vertical coil spring 50 and the engagement lip portion 52. In this fashion, the roller bias 38 can be adjusted to suit a customers preference, a users preference, or to accommodate a single design on a wide range of vehicles with varied specifications. This may be accomplished through a tension adjustment feature 54 mounted on the housing cap 56 covering the primary roller housing 34 (see FIG. 6). By adjusting the tension adjustment feature 54, such as the illustrated screw, the spring position may be moved inwards and outwards thereby decreasing and increasing the moment and resultant roller bias 38. In a second embodiment illustrated in FIGS. 8 and 9 the tension adjustment feature 54 may be formed as a cam element 58 formed in the inside surface 60 of the housing cap 56. In this fashion, by mere rotation of the housing cap 56, the position of the spring and resultant bias may be quickly and easily modified.

The roller bias 38 generated by the primary roller element 36 may be counterbalanced by a secondary roller element 62 that is preferably rotatably mounted in a stationary position. The secondary stationary roller element 62 is preferably rotatably mounted within a secondary stationary roller housing 64 mounted to the bezel element 28 opposite the primary roller element 36 such that the rollers 36,62 appear directly on opposite sides of the head restraint post 22. They are preferably orientated within the vehicle in a fore/aft direction relative to the vehicle. The secondary stationary roller element 62 also preferably has a concave roller engagement surface 40 and works in conjunction with the primary roller element 36 to ensure ease of adjustment while reducing vibration. In an alternate embodiment, the second roller element 62 may take the form of a lower roller element 66 positioned on the same side of the head restraint post 22 as the primary roller element 36 (see FIG. 7). In this embodiment, the lower roller element 66 is positioned below the primary roller 36 between it and the seatback intrusion end 24. This prevents rattle at both ends of the head restraint post 22. The lower roller element 66 may even be used in conjunction with the upper secondary roller element 62. The lower roller element 66 is preferably mounted to the guide stem 30 through the use of a lower circular spring 68 surrounding and mounting to the guide stem 30. The lower circular spring 68 may be used as the rotational axis of the lower roller element 66. A roller engagement port 70 may be formed in the guide stem 30 to allow a pathway for the lower roller element 66 to engage the lower portions of the head restraint post 22.

Figure 5:
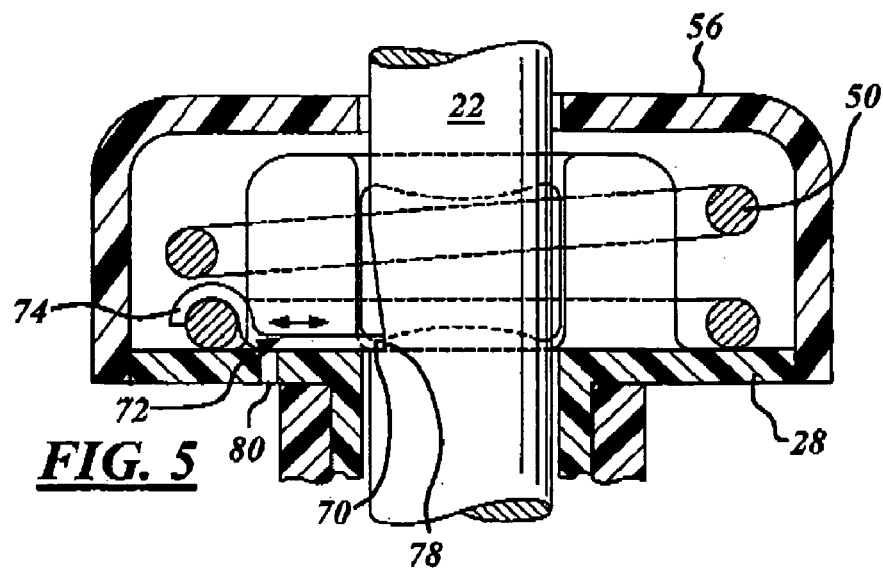
FIG. 5 is an illustration of the roller guide illustration in FIG. 2, the cross-section rotated to illustrate the lockplate leafspring element engaging a stop.

Finally, the present invention contemplates the use of a lockplate leafspring element 72 as is illustrated in FIGS. 3 and 5. The lockplate 72 has a circular engagement end 74 adapted to directly mount to the vertical coil spring 50 and a lock engagement end 76 for communication with the headrest restraint post 22. The headrest restraint post 22 has at least one stop notch 78 that when moved to engage the lockplate 72 limits motion of the post. It is contemplated that an upper and lower stop will be used, but a variety of stops are possible. The flexibility of mounting directly to the vertical coil spring 50 allows not only for the reduction in number of parts required for construction, but also allows for a simple but effective removal technique of the head restraint assembly 14 from the seatback 12. Any simple device, such as an alien wrench, may be placed through a access port 80 in order to simply push the lockplate 72 out of the way to allow the head restraint posts 22 to be completely removed from the guide stem 30. This further adds to the reduction in complexity by which the present invention has been finely tuned.

While particular embodiments of the invention have been shown and described, numerous variations and alternative embodiments will occur to those skilled in the art. Accordingly, it is intended that the invention be limited only in terms of the appended claims.

What is claimed is:

1. An automotive seat assembly comprising:
   a seatback assembly including an upper seatback surface;
   a guide stem positioned within said seatback assembly;
   a head restraint post positioned within said guide stem, said head restraint post including a head restraint mount end and a seatback insertion end;
   a head restraint element mounted to said head restraint mount end;
   a roller guide mounted in proximity to said upper seatback surface, said roller guide comprising:
   a bezel element;

a primary roller housing mounted to said bezel element;
a center cylindrical path through said primary roller housing and said bezel element, said head restraint post passing through said center cylindrical path and into said guide stem; and
a primary roller element rotatably mounted within said primary roller housing, said primary roller element movably biased into communication with said head restraint post by way of a roller bias such that said head restraint post is restrained from motion absent a vertical adjustment force.

2. An automotive seat assembly as described in claim 1, wherein said primary roller housing further comprises:
a living hinge connecting said primary roller housing to said bezel element, said living hinge having a vertical hinge bias, said vertical hinge bias generating a rotational moment in said primary roller housing which serves to generate said roller bias.

3. An automotive seat assembly as described in claim 2, further comprising:
a vertical coil spring positioned around said primary roller housing, said vertical coil spring engaging an engagement lip portion of said primary roller housing to generate said vertical hinge bias.

4. An automotive seat assembly as described in claim 3, further comprising:
at least one stop notch formed in said head restraint post; and
a lockplate leafspring element mounted to said vertical coil spring, said lockplate leafspring element engaging said at least one stop notch to limit motion of said head restraint post.

5. An automotive seat assembly as described in claim 3, further comprising:
a tension adjustment feature in communication with said vertical coil spring, said tension adjustment feature controlling position of said vertical coil spring on said engagement lip portion wherein said vertical hinge bias is adjusted.

6. An automotive seat assembly as described in claim 5, further comprising a housing cap mounted over said bezel element and covering said primary roller housing, wherein said tension adjustment feature comprises a cam element formed on an inside surface of said housing cap, said cam element adjusting said vertical coil spring by way of rotation of said housing cap.

7. An automotive seat assembly as described in claim 1, further comprising:
a secondary stationary roller housing positioned opposite said primary roller housing, said head restraint post positioned between said secondary stationary roller housing and said primary roller housing; and
a secondary stationary roller element rotatably mounted within said secondary stationary roller housing, said secondary stationary roller element rotatably engaging said head restraint post.

8. An automotive seat assembly as described in claim 1, further comprising:
a lower roller element rotatably mounted beneath said primary roller element, said lower roller element rotatably engaging said head restraint post at a position between said primary roller element and said seatback insertion end.

9. An automotive seat assembly as described in claim 8, wherein said lower roller element is rotatably mounted to a lower circular spring mounted to said guide stem, said lower roller element pressed into communication with said head restraint post through a roller engagement port formed in said guide stem.

10. An automotive seat assembly as described in claim 1, wherein said primary roller element comprises a concave roller engagement surface.

11. An automotive seat assembly as described in claim 1, wherein said primary roller element is mounted to said primary roller housing so as to allow lateral roller adjustment movement.

12. An automotive seat assembly comprising:
a seatback assembly including an upper seatback surface;
a guide stem positioned within said seatback assembly;
a head restraint post positioned within said guide stem, said head restraint post including a head restraint mount end and a seatback insertion end;
a head restraint element mounted to said head restraint mount end;
a roller guide mounted in proximity to said upper seatback surface, said roller guide comprising:
a bezel element in communication with said guide stem;
a primary roller housing mounted to said bezel element by way of a living hinge;
a center cylindrical path through said primary roller housing and said bezel element, said head restraint post passing through said center cylindrical path and into said guide stem;
a primary roller element rotatably mounted within said primary roller housing, said primary roller element movably biased into communication with said head restraint post by way of a roller bias such that said head restraint post is restrained from motion absent a vertical adjustment force;
a vertical coil spring positioned around said primary roller housing and engaging an engagement lip portion of said primary roller housing, said vertical coil spring generating a vertical hinge bias in said living hinge, said vertical hinge bias generating said roller bias in said primary roller element; and
a housing cap mounted over said bezel element and covering said primary roller housing.

13. An automotive seat assembly as described in claim 12, further comprising:
a secondary stationary roller housing positioned opposite said primary roller housing, said head restraint post positioned between said secondary stationary roller housing and said primary roller housing; and
a secondary stationary roller element rotatably mounted within said secondary stationary roller housing, said secondary stationary roller element rotatably engaging said head restraint post.

14. An automotive seat assembly as described in claim 12, further comprising:
a lower roller element rotatably mounted beneath said primary roller element, said lower roller element rotatably engaging said head restraint post at a position between said primary roller element and said seatback insertion end.

15. A method of adjustably restraining a head restraint post within a guide stem positioned within a seatback comprising:
holding said head restraint post in position within said guide stem using a roller bias generated against said head restraint post, said roller bias preventing motion of said head restraint post absent a vertical adjustment force; and generating said roller bias within a primary roller element mounted within a primary roller housing, said primary roller housing mounted to a bezel element inserted into said guide stem.

16. A method as described in claim 15, wherein said generating said roller bias comprises:
mounting said primary roller housing to said bezel element using a living hinge;
generating a vertical hinge bias within said living hinge by vertically loading an engagement lip portion of said primary roller housing using a vertical coil spring positioned around said primary roller housing;
using said vertical hinge bias to generate said roller bias within said primary roller element.

17. A method as described in claim 16, further comprising:
adjusting said vertical hinge bias using a tension adjustment feature, said tension adjustment feature altering said vertical hinge bias by controlling the position of said vertical coil spring on said engagement lip portion.

18. A method as described in claim 17, wherein said tension adjustment feature comprises a cam element formed on an inside surface of a housing cap positioned over said primary roller housing, said method further comprising:
rotating said housing cap such that said cam element controls the position of said vertical coil spring on said engagement lip portion.

19. A method as described in claim 15, further comprising:
counterbalancing said roller bias using a secondary stationary roller element mounted within a secondary stationary roller housing positioned opposite said primary roller housing such that said head restraint post is positioned between said secondary stationary roller housing and said primary roller housing.

20. A method as described in claim 15, further comprising:
counterbalancing said roller bias using a lower roller element rotatably mounted beneath said primary roller element.

* * * * *